Sept. 29, 1970          H. O. BUZZELL          3,531,351

PREPARATION OF LIGHT-POLARIZING FILM

Filed May 1, 1967          2 Sheets-Sheet 1

INVENTOR.
Harold O. Buzzell
BY Brown and Mikulka
and
Mark E. Jacobs
ATTORNEYS

Sept. 29, 1970          H. O. BUZZELL          3,531,351

PREPARATION OF LIGHT-POLARIZING FILM

Filed May 1, 1967          2 Sheets-Sheet 2

INVENTOR.
Harold O. Buzzell
BY Brown and Mikulka
and
Mark C. Jacobs
ATTORNEYS

United States Patent Office 3,531,351
Patented Sept. 29, 1970

3,531,351
PREPARATION OF LIGHT-POLARIZING FILM
Harold O. Buzzell, Wollaston, Mass., assignor to Polaroid Corporation, Cambridge, Mass., a corporation of Delaware
Filed May 1, 1967, Ser. No. 634,980
Int. Cl. B32b 31/08
U.S. Cl. 156—249      9 Claims

ABSTRACT OF THE DISCLOSURE

A composite light-polarizing material is fabricated by casting an aqueous solution of a dyeable material capable of forming a molecularly orientable film onto an optically smooth surface, laminating a film of polyvinyl alcohol thereto, removing the resultant composite structure from the optically smooth surface, molecularly orienting the structure, and, during the fabrication of said light-polarizing material, contacting the dyeable material with a dye which, upon orientation, renders said oriented film light-polarizing.

---

This application is a continuation-in-part of my copending application Ser. No. 319,727, filed on Oct. 29, 1963, now abandoned.

This invention relates to a process for preparing light-polarizing film and, more particularly, light-polarizing films for use in forming stereoscopic prints.

One object of this invention is to provide a process for preparing a film of light-polarizing material.

Another object of this invention is to provide a process for the preparation of light-polarizing films for use in the formation of light-polarizing images of photographic quality.

Still another object of this invention is to provide a process for the preparation of a lamination of polarizing films for use in forming a stereoscopic pair of dichroic dye images in superposed relation.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
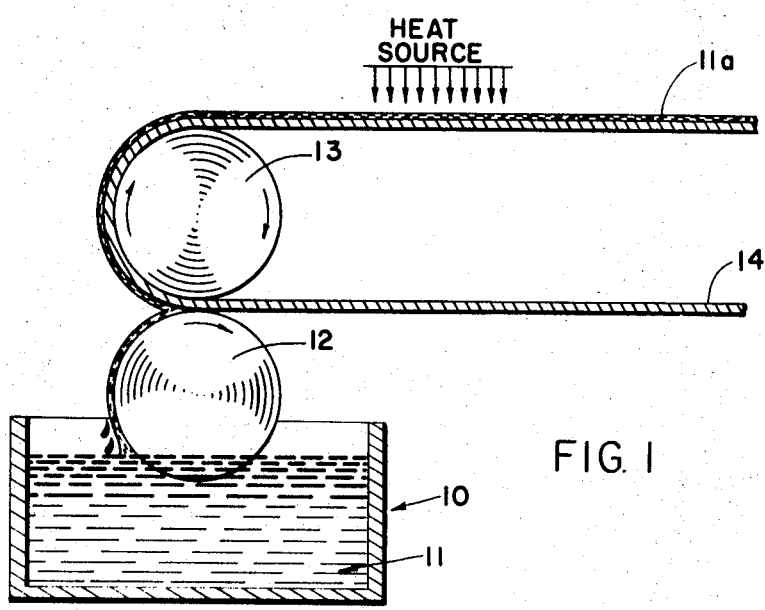
FIG. 1 is a diagrammatic illustration showing the application of a solution of dyeable polymer to a plastic belt.

Among the known methods of producing light-polarizing film materials is the process wherein a dichroic direct cotton dye is imbibed into a plastic film material of a type which has been stretched to provide therein a high degree of molecular orientation. The plastic film material comprises a dyeable polymeric film and may, for example, be composed of a transparent, molecularly oriented, linear, high molecular weight, hydroxyl-containing vinyl polymer, preferably polyvinyl alcohol. Where the dichroic dye is adsorbed by the film material, the latter is rendered light polarizing. The dichroic dye may be distributed uniformly throughout the film material, in which instance a light-polarizing sheet of substantially uniform density is provided. The sheet may be employed for various purposes, including the ophthalmic and photographic fields in the production of light-polarizing lenses and filters.

In certain situations it may be desirable to have the dye distributed differentially throughout the film material as provided by a line, halftone, or fulltone printing or transfer method in the formation of light-polarizing images of photographic quality. Such images have been employed in forming stereoscopic prints in which the right- and left-eye polarizing images usually have their polarizing direction extending at 90° with respect to one another. This is made possible by printing, from printing matrices or other printing means, each of a stereo pair of monochromatic dichroic dye images or each of the several color images making up a pair of stereoscopic images in full color of individual molecularly oriented films of the type above described, the two films of a stereoscopic pair being laminated to a support in superposed relation and with their directions of molecular orientation preferably being relatively disposed at 90°.

The prior art as typified by U.S. Pat. No. 2,996,956, issued Aug. 22, 1961, to William H. Ryan and Howard C. Haas, discloses and claims high dichroic ratio light-polarizing film material comprising a hydroxyl-containing vinyl polymer, a basic nitrogen-containing polymer as a mordant, a cross-linking agent and a direct cotton dye.

By the term basic nitrogen-containing polymer, now, and elsewhere in this specification, it is intended to include the polymeric free base, the quaternary salts and the corresponding organic or inorganic acid salts thereof.

In the past, the aforementioned materials were combined in one of several ways to form light-polarizing films. In the Ryan and Haas patent, for example, a single solution of dyeable polymer essentially comprising polyvinyl alcohol, a mordant comprising a polyvinyl acetal type of basic nitrogen-containing polymer and a cross-linking agent for the polyvinyl alcohol was cast into a film. The film was then stripped from the surface upon which it was cast, oriented, as by stretching, laminated to a supporting film base and then treated with a dichroic direct cotton dye in a manner known to the art. It is often necessary in the performance of such prior art processes to cast a film considerably thicker than the optimum desired. Other disadvantages of that process include the facts that the casting of relatively thick films introduces equipment and processing problems, in that a larger oven and more sustained heating would be necessary in order to remove the moisture from the thicker layer. The use of the additional heat required to dry the cast film layer would be undesirable, as the total heat used must be kept to a minimum in order to prevent excessive cross-linking of the film with the resultant loss of dyeability.

In an alternative method as disclosed and claimed in U.S. Pat. No. 3,058,393, issued Oct. 16, 1962 to W. H. Ryan and Leonard C. Farney, the solution of the polyvinyl acetal type of basic nitrogen-containing polymer, referred to hereinafter as the mordant polymer, and the cross-linking agent was coated onto a sheet of polyvinyl alcohol, dried and oriented.

The process of the present invention possesses none of the disadvantages associated with the process set forth in the previously mentioned Ryan and Farney patent, while offering many distinct advantages itself. When the mordant polymer was cast directly onto the polyvinyl alcohol sheet in accordance with the process set forth in U.S. Pat. No. 3,058,393, it was found that when said mordant polymer dried, puckering of the polymer could occur giving rise to difficult handling of the bi-layered film structure. Another disadvantage associated with that process was the fact that the density of the cast-mordant polymer varied because the film was not a flat surface of optical quality. The reason for the lack of an optical quality surface in the process set forth in the Ryan and Farney patent is that the polyvinyl alcohol film, being soluble in water, was dissolved to a very slight degree by the water present as a solvent for the mordant polymer coating applied thereto. This penetration of water into the polyvinyl alcohol base sheet has caused wrinkling, puckering and distortion in the base sheet. After orientation, the distortion that existed was not visually apparent until staining had been effected. It then was found, however, that an undesirable degree of non-uniformity had been thus introduced into the sheet, such that some areas of the sheet exhibited good dichroism and other areas exhibited poor dichroism.

In the process of the present invention, a novel method has been found to prepared improved light-polarizing film materials which are substantially thinner than has been heretofore possible and without any loss in dimensional stability of the support or diminution or impairment of the optical properties.

In the process of the present invention the mordant polymer is applied to a plastic belt which can comprise, for example, cellulose acetate butyrate, and which belt bears a thickness in the neighborhood of 15 mils. This gives rise to an evenness in the coating since the plastic belt undersurface possesses a dimensional rigidity. The coating when applied to the plastic belt has the ability to self-level and dries to a uniform thickness free from striations. This freedom from striation is due to the fact that the cellulose acetate butyrate upon which the mordant polymer is applied is not soluble in the water solvent of the polymer coating as is the case with the polyvinyl alcohol upon which the mordant polymer is cast in the previously referred to process of Ryan and Farney.

It should be noted that the mordant polymer film formed in the process of the present invention will have an optical surface, since the plastic belt upon which it was cast has an optical surface. The cast polymeric films of the prior art processes described above did not have such a characteristic.

The novel process of the present invention comprises the steps of preparing a solution of a dyeable, orientable polymer and applying a layer of said solution to a plastic belt having an optical surface to which the polymer is loosely adherent, drying said solution to provide a relatively thin film and then laminating said thin film to a film of molecularly orientable polymer utilizing an adhesive-acting agent to obtain the laminate. The thus-formed lamination consisting of the dyeable polymeric film and the molecularly orientable polymer is then separated from the belt. Since the dyeable polymer-molecularly orientable polymer bond is relatively strong in contrast to the weak bond between the dyeable polymer film and the plastic belt, the above-described lamination and separation steps may be carried out readily without any damage to the films. The laminated layers are then oriented by stretching and bonded to a dimensionally stable, transparent support. If the polarizing film materials prepared by the present invention are to be used in the formation of stereoscopic prints, a second dyeable polymer layer is laminated to the opposite side of the base, i.e., distal the first lamination.

It should be understood that both the dyeable polymer film and the polymer designated above as the orientable polymer must comprise polymers which are capable of being provided with a molecular orientation, as by stretching. By laminating the dyeable polymer film to a thicker and more physically substantial polymer and orienting the two polymers together, it is possible to achieve readily and uniformly the desired degree of molecular orientation without adversely affecting the physical or optical properties of the dyeable polymer film.

In a preferred embodiment, the solution of dyeable polymer is diluted with a volatile solvent to approximately 5% solids prior to coating on the plastic belt in such an amount as to provide a dry film thickness of about 0.1 to 0.6 mil. The plastic belt comprises a material to which the polarizing film forms only a loose bond; cellulose acetate butyrate is preferred for use as the plastic belt since adhesion between the cellulose acetate butyrate and the type of polyvinyl polymers used in preparing the polarizing materials is weak and because an optical surface can be obtained using cellulose acetate butyrate.

Referring now to the drawings, FIG. 1 illustrates the application of the solution of dyeable i.e., the mordant, polymer to the plastic belt. The container 10 holds a solution of dyeable polymer 11 which is transferred to plastic belt 14 by coating roll 12. The thus-coated plastic belt is then passed around backing drum 13 to a heat source, drying the layer of solution 11 to provide dyeable polymer film 11a. As stated above, plastic belt 14 may comprise any material to which the dyeable polymer film will adhere but which has a sufficiently weak bond to permit separation easily without damage to the film. In a preferred embodiment, the plastic belt is cellulose acetate butyrate.

Figure 2:
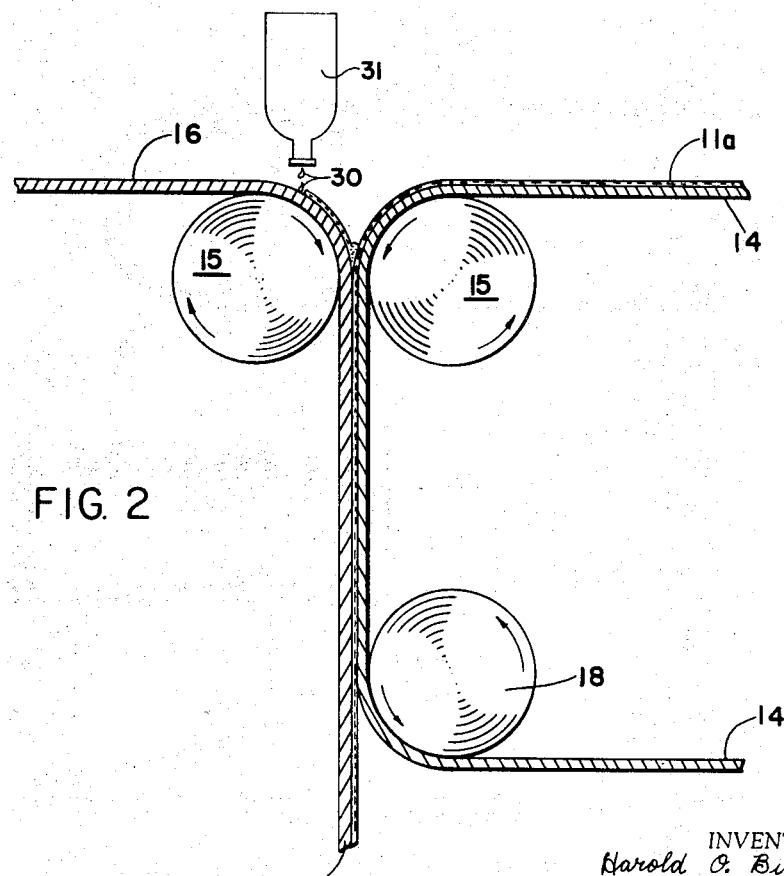
FIG. 2 is a diagrammatic illustration showing the lamination of the dried dyeable orientable polymer layer to an orientable polymer.

FIG. 2 illustrates the formation of the lamination 17 of the orientable polymer and the dyeable polymer film by passing the molecularly orientable polymer 16 and a dyeable orientable polymer film 11a carried on a plastic belt 14 through laminating rollers 15. A drop emitter 31, releases droplets 30, of a substance such as water which will tacify the mordant polymer and the orientable polymer to a slight degree prior to the formation of the lamination. A 1–2% solution of completely hydrolyzed polyvinyl alcohol is preferred as the tacifying agent when polyvinyl alcohol is used as the molecularly orientable polymer. Since the drops comprising the bead of "adhesive" are absorbed by both layers of polymer comprising the laminate, during the compression between the rollers 15, a distinct adhesive layer is not visible in the laminates.

The dyeable polymer film adheres to the molecularly orientable polymer 16 and is then easily separated from the plastic belt 14 since the adhesive capacity of the bond between the dyeable polymer and the belt is less than the adhesive capacity of the bond between the dyeable polymer and the molecularly orientable polymer. This first referred to bond is broken by passing the belt around a drum 18.

The thus-formed lamination 17 is then oriented, as by e.g., stretching, techniques known to the art to provide molecularly oriented film.

Figure 3:
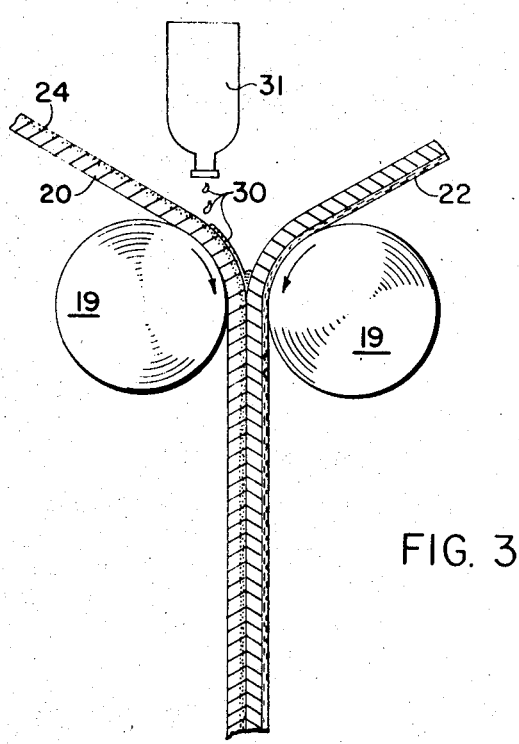
FIG. 3 is a diagrammatic illustration showing the bonding of the resulting molecularly oriented dyeable polymer film to a dimensionally stable plastic base.

FIG. 3 illustrates the lamination of the molecularly oriented film 22 to a transparent, plastic base 20, by passing said film and base between laminating rolls 19. Base 20 is formed of a suitable plastic material which is dimensionally stable and thus contributes to the holding of film 22 in its stretched condition. Cellulose acetate, cellulose triacetate and cellulose acetate butyrate may be mentioned as preferred base materials. The selected cellulose base is either subcoated or surface treated to create an affinity for the polyvinyl alcohol stretched sheet such that when said sheet is laminated to the base with a bonding agent, as shown by the drop emitter 31 and the adhesive 30, it will adhere. Preferably cellulose triacetate is selected for the base material and the surface is hydrolyzed, illustrated by the dotted area 24 in FIG. 3, to provide the capacity for adhesion of the layers upon bonding.

When a film structure is desired for use in the preparation of a pair of streoscopic images, another molecularly oriented film having a 90° orientation difference with respect to the first molecularly oriented film may be laminated to the opposite side of support 20 according to the above-described procedure.

Figure 4:
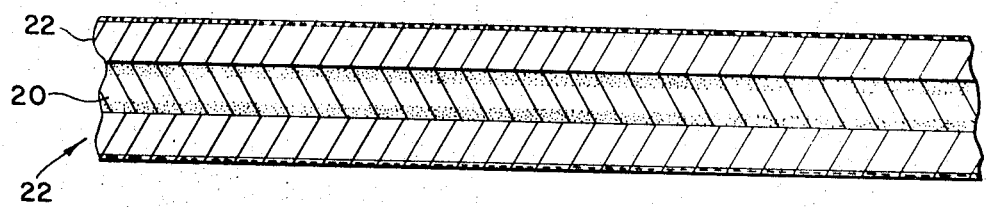
FIG. 4 is a diagrammatic side view of polarizing sheet stock prepared by the method of the present invention.

FIG. 4 is an exaggerated side view showing a section of plastic base 20 with molecularly oriented films 22 laminated to both sides.

Superposed, light-polarizing, stereoscopic left- and right-eye images may be formed on the film elements shown in FIG. 4 by methods known to the art, e.g., the procedure set forth in U.S. Pat. No. 2,931,272, issued Apr. 5, 1960, to Howard C. Haas.

In the process of the present invention, a dyeable orientable polymer bearing a mordanting function is transferred in solution by adhesion from a vessel onto a non-absorbent plastic belt, where it sets up and forms a film. This polymer should be clear in color, castable, stretchable, possess mordant sites than can react with a dye, be sufficiently swellable in water to be dyed, that is, have its mordant sites exposed and also exhibit good dichroism after appropriate dyeing. Suitable dyeable polymers bearing a mordanting function are the basic-nitrogen polymers, which include but are not limited to, poly-N-methyl-4-vinyl pyridinium tosylate, polydimethylaminoethylmethacrylate, deacetylated chitin, polyvinyl pyridine quaternary ammonium salts, polyvinyl acetals of an amino aldehyde and the normal and quaternary salts thereof, and paratrimethylammoniumbenzaldehyde tosylate acetal of polyvinyl alcohol. Ofttimes it has been found beneficial to add a cross-linking agent to improve the properties of the polymer, such as to maintain the dimensional stability of the polymer against ambient humidity, and to meet the above-mentioned characteristics. Improved results at lower cost have been obtained with some of the above polymers when a matrix polymer is utilized in conjunction therewith. Typical matrix polymers include cellulose, polyhydroxymethtylene, several of the nylon polymers and polyvinyl alcohol, as well as any other polymer which is compatible with the basic nitrogen-containing polymer and which allows said polymer to perform as desired.

In a preferred embodiment, para-trimethyl ammonium benzaldehyde tosylate is reacted with polyvinyl alcohol to create a substituted polyvinyl alcohol bearing acetal linkages as the basic nitrogen-containing polymer. Any cross-linking agent that is capable of reacting with the remaining alcoholic hydroxyls of the polyvinyl alcohol of this embodiment, or polyvinyl alcohol when such is used as the matrix, can be used. Among these are the diepoxides such as the diglycidyl ether of butane diol; the alkyl esters of organic dicarboxylic acids such as the dimethyl and diethyl esters of acids such as adipic, terephthalic, fumaric and glutaric acids; organic diisocyanates such as toluene diisocyanate, and hexamethylene diisocyanate, as well as compounds such as dimethylolurea, boric acid and glyoxal, this last being preferred.

While the cross-linking agent may tend to decrease the ability of the polymer to accept the dye, this tendency is offset, at least in part, by the fact that the basic nitrogen-containing polymer carries a positive charge. It is thus particularly effective for use with dichroic direct cotton dyes which include acid residues in their molecular structure, as for example, phenolic groups or sulfonic acid groups, said dyes being thereby negatively charged. The resulting electrostatic attraction between oppositely charged molecules of the mordant and the dye constitutes a condition where the dye is attracted and held fast in an area which would otherwise not be readily dyeable or which would tend to permit an unwanted lateral diffusion of the dye where dichroic dye images are involved.

It is to be understood that diluents such as methanol, water and dimethylformamide, surfactants, such as Triton X–100, trade name of and sold by Rohm and Haas Co., Philadelphia, Pa., for its non-ionic isooctylphenylpolyethoxyethanol dispersing agent, as well as a catalyst for the cross-linking reaction, usually an inorganic acid or base, the choice of catalyst being dependent upon the cross-linking agent utilized, can all be employed in the process of the present invention.

In the preferred embodiment HCl is used as the catalyst with the glyoxal.

This film which is now cast upon the plastic belt, is laminated to a sheet of polyvinyl alcohol by way of an adhesive material such as water, though a 1–2% solution of 100% hydrolyzed polyvinyl alcohol in water is preferred. As is shown in FIG. 2, the adhesive capacity of this laminate is greater than the adhesive capacity of the first cast film to the plastic belt and so the film is stripped away from the belt. This new laminate is then oriented as a single unit, for instance, by stretching in a given direction; followed by lamination of the underface of the polyvinyl alcohol sheet to a transparent, dimensionally stable base such as cellulose acetate butyrate or cellulose triacetate. A dichroic direct cotton dye is applied directly to the surface of the first cast film in accordance with techniques known in the art. Examples of direct cotton dyes which are suitable for the purpose include those set forth in U.S. Pat. No. 3,058,393, issued Oct. 16, 1962 to W. H. Ryan et al., as well as Primula Yellow, Direct Red No. 117 and Benzanol Fast Violet R. R.

It will be readily apparent for the reasons set forth previously that dyes which lack an acidic group would be unsuitable.

The reason for the improved density ratios characteristic of certain of the light-polarizing materials described herein has not been entirely established. It is believed, however, that the combination of the basic nitrogen-containing compound and the cross-linking agent with the hydroxyl-containing vinyl polymer and dichroic direct cotton dye primarily serves to maintain a high degree of molecular orientation adjacent that surface of the film into which the dye is imbibed, together with providing a marked propensity for receiving the dye. These properties lead to an adequate dichroism and dye density, as well as greatly improved definition, in areas which would otherwise be deficient in one or more of these respects.

It is to be further understood that while the preferred embodiment utilizes an endless plastic belt as the surface upon which the first film is cast, satisfactory results can also be obtained when the invention is practiced using a belt of another material such as metal or when practiced in a batch type process using a plastic, metal such as aluminum, or glass support sheet from which the film can be easily stripped after the lamination step, as the cast film receiving surface.

The following non-limiting example illustrates the process of the present invention.

EXAMPLE I 10.8 gm. of p-trimethyl ammonium benzaldehyde-p-toluene sulfonate was dissolved in 900 gm. of water. To this solution was added 184 gm. of polyvinyl alcohol and 11 cc. of 3 N-hydrochloric acid. The mixture was sealed and held at 95° C. for seventeen hours. It was cooled to room temperature and a small amount of a 2% aqueous solution of Triton X–100 and 6 cc. of glyoxal were added. Sufficient acid is present such that additional acid as a catalyst for the glyoxal is not required. The solution was then diluted to a viscosity of 56 sec. on a Zahn number 2 cup with a 1:2 methanal-water mixture. By diluting the solution to a standard viscosity, any batch to batch variation in the polyvinyl alcohol can be adjusted.

This mixture was cast at room temperature onto a belt of cellulose acetate butyrate and dried to form a film. The surface of the film more distant from the belt was brought into contact with a sheet of polyvinyl alcohol, an adhesive having been added at the interface prior to contact, thereby forming a laminated composite structure.

The cellulose acetate butyrate belt was stripped from the composite structure which was then stretched to provide molecular orientation and then laminated to a transparent dimensionally stable coated base of cellulose acetate butyrate. The clear, colorless, three layer structure was now ready for dyeing according to known techniques for dye transfer processes incorporating a direct cotton dye.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. The process of preparing a composite light-polarizing material comprising:
    (a) contacting an optically planar substrate with a material comprising an aqueous polymeric solution capable of forming a solid, continuous dyeable film on said substrate;
    (b) causing said solution to form a first solid, continuous, dyeable film which is capable of being molecularly oriented;
    (c) contacting said first film with a solid, continuous film comprising polyvinyl alcohol;
    (d) laminating said polyvinyl alcohol film to said first film thereby forming a composite structure, the components thereof being adhered, each to the other, by a bond stronger than the bond adhering said substrate to said first film;
    (e) separating said substrate from said composite structure;
    (f) orienting said composite structure to a predetermined degree of molecular alignment;
    (g) laminating said molecularly oriented composite structure to a dimensionally stable transparent support; and
    (h) contacting said dyeable material during fabrication of said light polarizing material with a dye which, upon orientation, renders said oriented first film light polarizing.

2. The process of claim 1 wherein the optically planar substrate comprises an endless plastic belt.

3. The process of claim 1 wherein said polymeric solution comprises:
    (a) the reaction product of polyvinyl alcohol with a basic nitrogen-containing compound; and
    (b) a cross-linking agent for polyvinyl alcohol.

4. The process of claim 3 wherein said basic nitrogen-containing compound is p-trimethyl ammonium-benzaldehyde-p-toluene sulfonate, and said cross-linking agent is glyoxal.

5. The process of claim 4 wherein said dimensionally stable transparent support is selected from the group consisting of cellulose acetate butyrate and cellulose triacetate.

6. The process of claim 1 wherein a second molecularly oriented composite structure is laminated to the side of said dimensionally stable support, distal the lamination of the first composite structure, the said second composite structure being positioned so that its direction of orientation is 90° to the direction of the orientation of said first molecularly oriented composite structure lamination, to provide thereby a polarizing film element for use in the preparation of a stereoscopic pair of polarizing images.

7. The process of claim 5 wherein a second molecularly oriented composite structure is laminated to the side of said dimensionally stable support, distal the lamination of the first molecularly composite structure, said second composite structure being positioned so that its direction of orientation is 90° to the direction of the orientation of the first molecularly oriented composite structure lamination, to provide thereby a polarizing film element for use in the preparation of a stereoscopic pair of polarizing images.

8. The process of claim 1 wherein said polymeric solution comprises a basic nitrogen-containing polymer selected from the group consisting of deacetylated chitin, poly-N-methyl-4-vinyl pyridinium tosylate, polydimetnyl-aminoethylmethacrylate, a polyvinyl pyridine quaternary ammonium salt, and paratrimethyl ammonium benzaldehyde tosylate acetal of polyvinyl alcohol.

9. The process of claim 2 wherein said polymeric solution comprises a basic nitrogen-containing polymer and a cross-linking agent selected from the group consisting of glyoxal, boric acid, toluene diisocyanate, and dimethylolurea.

References Cited

UNITED STATES PATENTS

| | | | |
|---|---|---|---|
| 2,274,706 | 3/1942 | Keim | 350—155 |
| 2,487,063 | 11/1949 | Marks | 156—99 X |
| 2,527,400 | 10/1950 | Cooper | 156—99 X |
| 2,524,286 | 10/1950 | Dreyer | 350—155 |
| 2,892,383 | 6/1959 | Walworth et al. | 350—132 |
| 2,996,956 | 8/1961 | Ryan et al. | 350—132 |
| 3,015,989 | 1/1962 | De Langre et al. | 350—155 X |
| 3,058,393 | 10/1962 | Ryan et al. | 350—155 X |
| 3,130,113 | 4/1964 | Sitman | 156—249 |

REUBEN EPSTEIN, Primary Examiner

U.S. Cl. X.R.

156—99; 350—132, 155